Feb. 6, 1962 P. ALEXANDER 3,020,177
ART OF VAPORIZING MATERIALS
Filed May 13, 1959 4 Sheets-Sheet 1

INVENTOR.
PAUL ALEXANDER
BY
Mason, Porter, Diller & Stewart,
ATTORNEYS

FIG. 8ᵃ

Feb. 6, 1962 P. ALEXANDER 3,020,177
ART OF VAPORIZING MATERIALS
Filed May 13, 1959 4 Sheets-Sheet 3

INVENTOR.
PAUL ALEXANDER
BY
Mason, Porter, Diller & Stewart,
ATTORNEYS

Feb. 6, 1962

P. ALEXANDER 3,020,177

ART OF VAPORIZING MATERIALS

Filed May 13, 1959

INVENTOR.
PAUL ALEXANDER
BY
Mason, Porter, Diller & Stewart
ATTORNEYS

United States Patent Office 3,020,177
Patented Feb. 6, 1962

3,020,177
ART OF VAPORIZING MATERIALS
Paul Alexander, Princeton, N.J., assignor to Continental Can Company, Inc., New York, N.Y., a corporation of New York
Filed May 13, 1959, Ser. No. 812,897
12 Claims. (Cl. 117—107)

This invention relates to the vacuum deposition of materials, and is more particularly concerned with vaporizer elements having long effective lives and operated to provide uniform generation throughout their lives.

It is known to heat a vaporizable substance in vacuum whereby its vapor is generated, and to effect deposit of such vapor upon a substrate as a coating of desired thickness thereon. As brought out in my prior patents, the vaporizing element can be connected in an electrical circuit and thereby heated resistively to a temperature at which the vapor is evolved; with feeding of the deposit material to the vaporizing element so that it is melted and caused to form a film from which the vaporization occurs regularly and without the projection of material particles of major size; and with employment in such vaporizing elements of materials which are resistant to quick erosion by the molten material.

A prevailing practice in the employment of resistively heated vaporizer elements is to supply the deposit material, e.g. aluminum, in the form of wire and to move the lower end of the wire back and forth along the length of the element: that is, the metal is being melted and evaporated from successive regions along the length of the element. The rate of feeding of the wire to the element is correlated to the rate of evaporation; so that the film of molten metal does not deepen undesirably on the one hand, and so that the vaporizer element does not become "dry" at a working area by evaporation of all molten metal therefrom on the other hand. With such practice, fresh deposit metal is being melted and quickly brought to evaporation temperature at points closely adjacent parts of the vaporizer element at such temperatures; and a result is to produce irregular erosion effects.

According to the present invention, a resistively heatable material is employed for the vaporizing element, and the element has a cavity for receiving and containing the molten deposit material as an incident leading to its evaporation, and the element is so constructed and employed that the erosion effects are of minimal consequence to the vaporization proper.

An object of the invention is the provision of a heater and vaporizer element which has a graduated temperature range along its surface so that the melting and dissolution of the deposit material is procured at a temperature effective for the purposes but below that of substantial vaporization, and another part of the element is at the higher temperature so that vaporization occurs thereat.

Another object is the provision of a heater and vaporizer element which can be employed in tilted position.

A further object is the provision of a heater and vaporizer element so constructed and operable that the erosion of the element material is effected in a region separate from the region of major evaporation therefrom.

A further object is the provision and operation of a heater-vaporizer element in which the melting or fusion of the deposit material is effected at a zone maintained at a temperature only slightly above that for the melting and hence provoking only minor dissolution of the element material, and in which the molten deposit material is further heated in a regular fashion while being led from the fusion region to an evaporation region, thereby attaining regularity of dissolution by the molten material upon the surface of the element with a smooth and uniform profile being maintained.

With these and other objects in view, as will appear in the course of the following description and claims, illustrative practices of the invention are shown on the accompanying drawings, in which:

FIG. 8a is a like end view of a modified section;

In operations of vacuum deposition, it has been found desirable to have the vaporizer element, for the surface thereof in contact with the molten deposit material, competent of being wetted by this material, so that the metal will spread out in a thin film which will evaporate at a regular rate and without sputtering or discharge of particles of major size, as can occur when a pool of the deposit material is heated from its bottom so that vapor bubbles form beneath an overlying layer of the material and which in bursting cause the sputtering of such particles. If such major particles are deposited on the substrate, the coating is irregular and the particles may cause a localized source of sufficient heat energy to damage a substrate: if the particles are not deposited, there is a loss in the economics of the operation. The competence of being wetted by the deposit material implies a dissolution effect; and therewith the molten mass becomes a solution of the vaporizable metal with a solute of substances derived from the element; and erosion of the element has occurred. This erosion represents a reduction of the element section, and requires change of the heating current intensity to maintain the element in service. As evaporation occurs from this solution, the solute content exceeds the saturation point, and it is deposited and modifies the element surface, therewith also changing the current demand at the cross-section at which the deposit has occurred. Continual feeding of the deposit material leads to further dissolution, so that the molten material brought to the region of such deposits is already essentially saturated with solute and is unable to redissolve the deposit. Further, the presence of the solute modifies the rate of evaporation therefrom at a given temperature: and hence the temperature must be adjusted, by change of the current flow, to maintain the uniform evolution of vapor which is required for regular deposition.

According to this invention, melting and evaporation are effected in separate regions; and the saturation of the molten deposit material as a solvent with the element material as a solute, is accomplished at a region separate from the point at which the melting is being effected: and preferably so that a state of essential saturation at prevailing temperature is attained before major evaporation begins. Therewith, the cross-section of the element is varied in such fashion that a deep section is provided at the melting and dissolution regions so that these portions have long life: and the cross-section is relatively decreased at the evaporation region so that the heating thereat, for a given current intensity of flow between the ends of the element, is greater than at the melting region.

Figure 1:
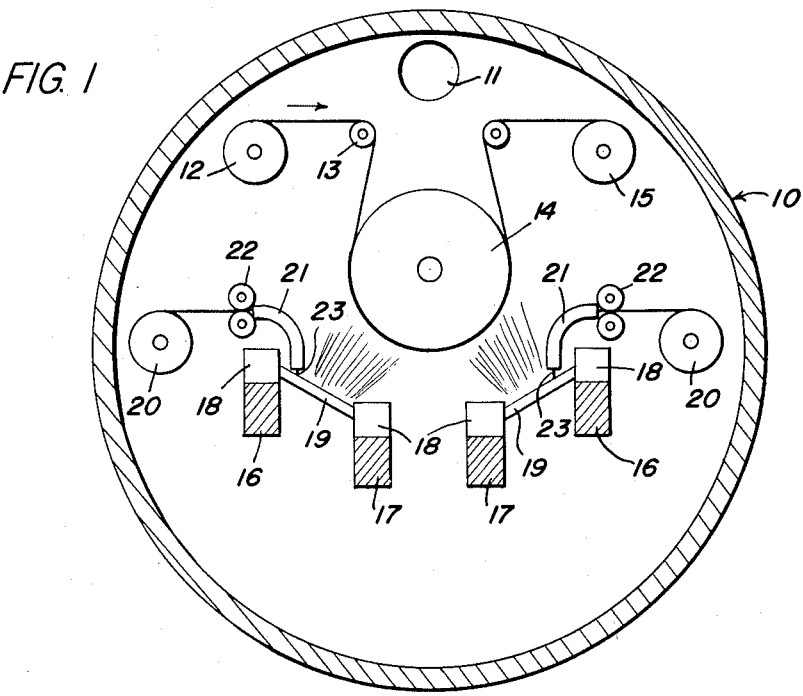
FIG. 1 is a conventionalized upright cross-section of a vacuum deposition chamber, with a heater according to this invention therein.

In the vaporizing system of FIG. 1 the chamber 10 is evacuated by exhausting through the conduit 11. Within the chamber, a supply coil 12 delivers a substrate web over a guide roll 13 and the cooled deposit roll 14, and is rewound upon a driven take-up shaft 15. The chamber has pairs of bus bars 16, 17 at differing potentials. Terminal blocks 18 on these bus bars support and provide electrical conduction to the ends of the heating and vaporizer elements 19, so that current flows therethrough and they are resistively heated. Filaments of the deposit material are provided on spools 20 and pass through guides 21 and are advanced by the driven feeding rolls 22 so that the ends of the filaments 23 are brought to the heater and vaporizer elements 19 and melted thereon.

Figure 2:
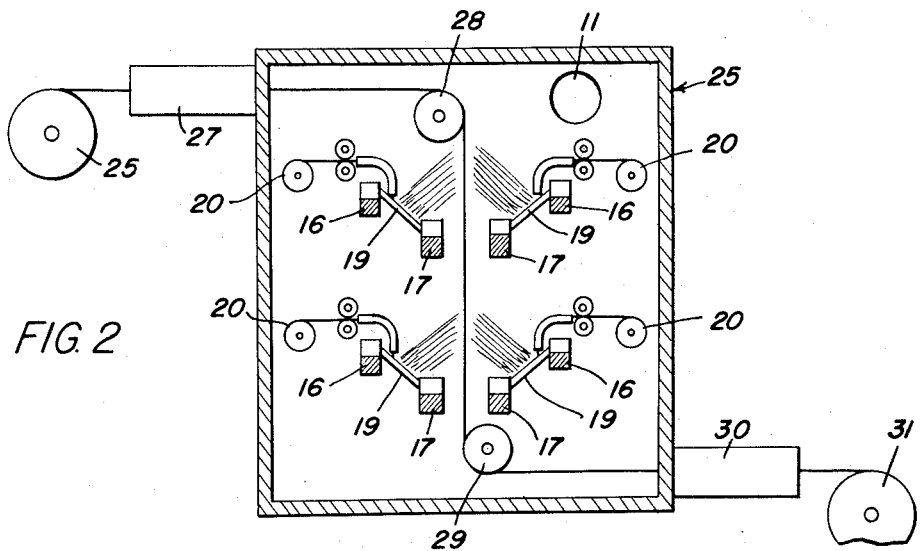
FIG. 2 is a similar view of a vacuum deposition chamber, in which a substrate web moves in a vertical plane during deposition thereon.

In the vaporizing system of FIG. 2, a supply coil 25 is external to the vacuum chamber 26 and delivers a substrate web through an inlet seal shown conventionally by its housing 27 into the chamber, with a turning roll 28, so that the web travels downward in the chamber between the sets of vaporizer elements 19 located adjacent both faces of the web, and then passes around a turning roll 29 and to the atmosphere through an outlet seal 30 to a take-up reel 31. Evacuation is by the conduit 11.

In each form the heater discharges its evolved vapor in directions substantially at right angles to the top of the element, as shown.

Figure 3:
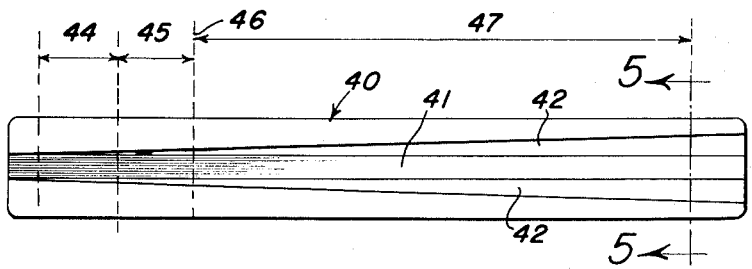
FIG. 3 is a top plan view at a larger scale, of a first form of heater and vaporizer element according to this invention.
Figure 4:
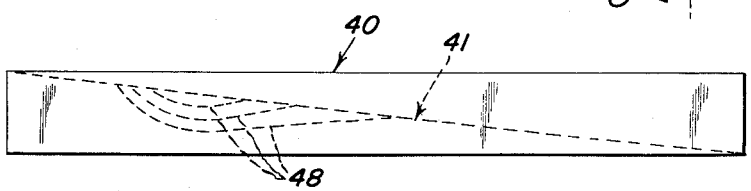
FIG. 4 is a side elevation of the device of FIG. 3.
Figure 5:
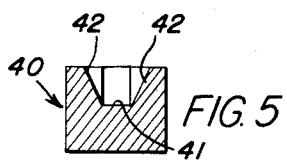
FIG. 5 is an upright cross-section on line 5—5 of FIG. 3.

The form of such heater and vaporizer elements as shown in FIGS. 3–5 comprises a body 40 which may be 5 inches (125 millimeters) long, ½ inch (12.5 millimeters) wide and ⅜ inch (9.5 millimeters) deep, thus being of generally rectangular outline in cross-sections but with a groove in its top having a floor 41. This groove at one end of the body can have a depth of 3/16 inch (4.7 millimeters), being about half the depth of the body; and has a floor 3/16 inch (4.7 millimeters) wide and extending in a plane toward the other end of the body, inclining upward to zero depth at such other end. The side wall surfaces 42 of the groove are shown inclined upward and outward at angles of about 50 degrees relative to the floor so that the groove is wider at its top than at its bottom. The resulting effective cross-section of material in the body thus is equal to the outline section at the left-hand end in FIGS. 3 and 4, and decreases regularly, toward the right-hand end, so that there is a deeper section of the element material at the left-hand end. Therewith, the current flowing along the element meets less resistance down to a minimum adjacent the left-hand end and the terminal block engagement thereat; so that the wattage heating effects correspondingly vary and the right-hand end is more highly heated than other portions.

Such an element may be of titanium boride when aluminum is to be deposited. The element is heated by current passage until the left-hand end for the region 44 is maintained above the melting point of aluminum but below a temperature of significant evaporation, noting that evaporation rate is very low at the melting point and increases very rapidly with increase of the element surface temperature under the vacuum condition. The right-hand end therewith is more highly heated, to a temperature at which there is a high vapor pressure and a rapid evaporation in the vacuum.

As the aluminum melts in the groove region shown by bracket 44, it spreads out on the wettable surface, but does not evaporate significantly: therewith it dissolves a very small amount of the body substance, noting that titanium boride is often described as insoluble in molten aluminum, and moves downward along the floor of the groove in a depth of 0.020 to 0.125 inch determinable by adjustment of the speed of the driven feed rolls 22 and constantly increases in temperature in its flow, as the successive body areas are hotter and hotter. In the initial spreading and flow at the region of bracket 45, the molten aluminum becomes saturated with the element substance at its contact therewith, and when a temperature of significant evaporation is encountered e.g. at line 46, the vapor is delivered regularly from the top surface of the liquid and therewith the concentration of solute is increased. In operation, the saturation point varies slightly with temperature, and thus as the temperature of the molten metal increases during its rightward flow from the line 46, more of the element material is dissolved and a condition of saturated solution with a greater and greater content of the solute, i.e. the element material, occurs at the lower surface of the flowing film. A partially counter-balancing action occurs adjacent the line 46, due to evaporation of the deposit metal, so that the relative concentration of the solute is increasing for this reason: and this counterbalancing effect of concentration by reduction of the relative amount of the solvent, i.e. molten deposit metal, continues so long as such deposit metal is present for evaporation. At some stage, with the downstreamward distance from the line 46 changing during the life of the element, a condition of supersaturation at the prevailing temperature is reached and a re-deposition can occur. Such redeposition is essentially uniform because the molten metal film moves along the groove to the end of the evaporation region, i.e. the end of the region denoted by the bracket 47, with its film depth decreasing as evaporation occurs, and with the greater and greater heating being effective to maintain regularity of evaporation of the essentially saturated solution as it passes from one region to the next and more highly heated one. Therewith the molten film has a regularly decreasing depth: and the redeposition itself is regular and does not provide dams which disturb the film flow. It will be noted that the increasing temperature effects cause greater and greater ratios of solute to solvent to be maintained, rather than an abrupt change of condition at which a large part of the solute is suddenly precipitated. Thus, both during the dissolution and re-deposit phases, a uniform and regular action is occurring. In service, the element is eroded as shown by the dotted lines 48 in FIG. 4 adjacent the passage from the melting region: but the body depth is greater here than at other and lower parts of the groove, so that erosion does not destroy the utility of the element. In practical operation, the evaporation essentially occurs in the region shown by the bracket 47 with the described regularity. The erosion pit forms at the region of the bracket 45, gradually deepening and extending during the service life.

Figure 18:
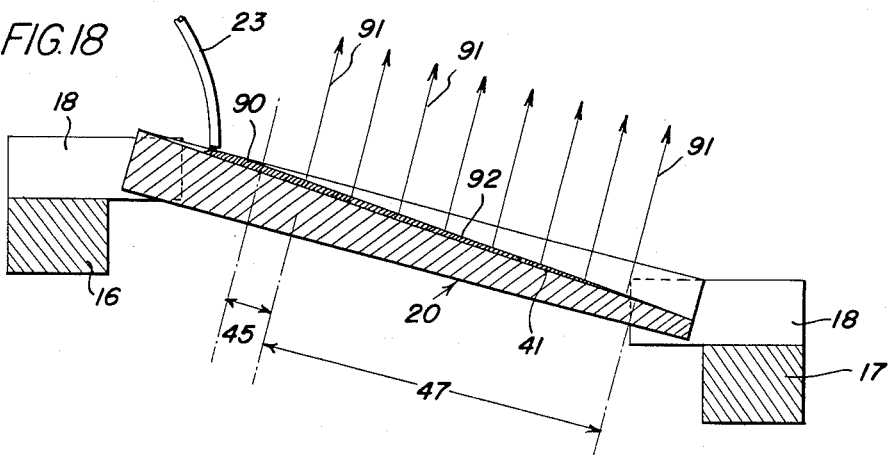
FIG. 18 is a longitudinal upright section of a heater in service, on a larger scale than FIGS. 1 and 2, showing the conduction of current thereto, and indicating melting and vaporization zones.

The downward slope of the floor of the groove 41 is about 2 degrees when the element is horizontal: and this is sufficient in many cases for a regular downward flow of the molten material. It is preferred to have the floor at a greater angle, e.g. as shown in FIGS. 2 and 18, noting that the two general controls of the feeding rate for the deposit material and the current intensity for the heating can be coordinated for the specific floor angle, and that this rate and intensity require no successive changes after the element has been brought to the desired operational condition. The angularity can be from 2 to 45 degrees, for the element of FIGS. 3–5. In practice optimum effects as to control of corrosion effects and ultimate life, are attained with the groove floor at about 6 to 20 degrees.

Figure 8:
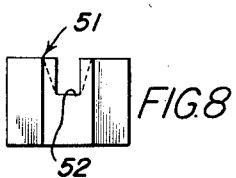
FIG. 8 is an end view of the element of FIGS. 6 and 7.
Figure 6:
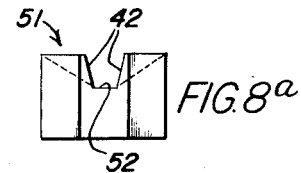
FIGS. 6 and 7 are respectively a top plan and a side elevation of a second form of the element.
Figure 6:
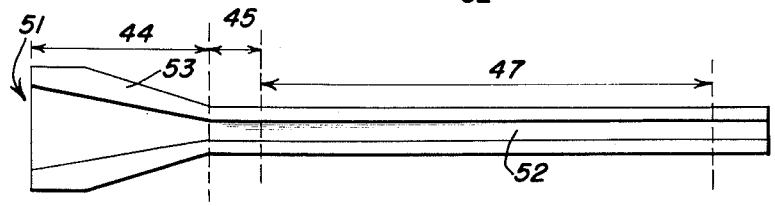
Figure 7:
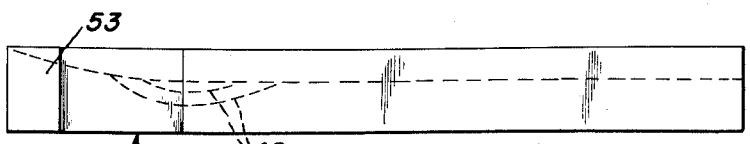

The form of element 50 shown in FIGS. 6–8 is similiar to that of FIGS. 3–5, in having a larger section at the end for melting the deposit material than at the other end. In this form, the body 51 has a top groove, and the evaporation region 47 is of substantially uniform U-shaped cross-section, about 4¾ inches long, ½ inch wide and 7/16 inch deep in outline, the groove having a floor 52 about ¼ inch wide and 3/16 inch deep. The larger end 53 of the element has a sectional outline ⅞ inch wide and 7/16 inch deep, and parallel side surfaces for about ⅜ inch, with these side surfaces then converging to the section at the evaporation region 47. The melting is accomplished in a region 44 of the groove, this part having a floor which slopes downwardly from the element top as a curved surface merging with the part of the floor 52 in the intermediate zone 45. The side wall surfaces of the groove portion 44 are preferably bevelled and likewise converge from the end of the element to junction with the side wall surfaces of the groove portion 52. This form of element is supported so that its larger end 53 is at a higher level than the lower end, with the floor 52 at an angle as before, of 2 to 45 degrees. During operation, the deposit material is melted at the upper wide portion 44 of the groove, and flows downward along the curved floor of the portion 44, across the region 45 and thence along the floor 52, at a depth as before. In the wide portion of the element and groove the heating is enough for the melting but not for significant evaporation. The element is more greatly heated at the portion between the lines of bracket 47: erosion begins in the groove portion of the region denoted by the bracket 44, with continuance to saturation at the region 45 and ultimately a pit forms in the region designated by bracket 45, widening and deepening as shown by lines 48, FIG. 7, until the element fails. On the other hand, no erosion occurs in the lower and hotter evaporation region of bracket 47, but deposition of solute occurs on the floor and walls thereof. The total length of the element is about 6 inches. In FIG. 8, the groove has upright walls from the floor 52: and in FIG. 8a, these walls 42 are bevelled as in FIGS. 3–5. The form of FIG. 8a is preferred, because evaporation occurs from the exposed surface of the film so that the re-deposit of material dissolved from the element tends to occur upon the upright walls of FIG. 8 at the level of this exposed surface, forming ribs projecting over the film and thus reducing the escape area for the vapor.

Figure 9:
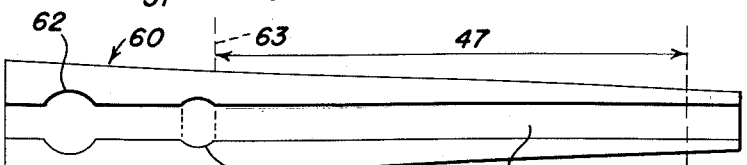
FIGS. 9 and 10 are respectively a top plan and a side elevation of a third form of the element.
Figure 10:
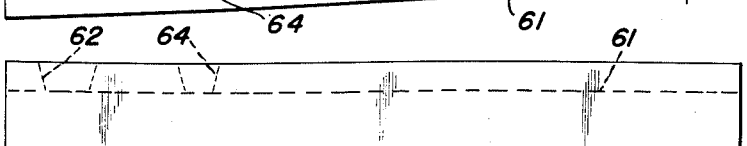
Figure 11:
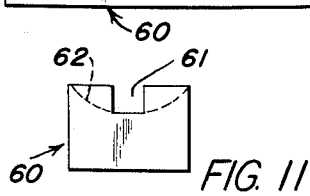
FIG. 11 is an end view of the element of FIGS. 9 and 10.

The form of element 60 in FIGS. 9–11 is that of uniform depth of 7/16 inch for the body. The side wall surfaces convergently taper from an end ⅞ inch wide to an end ½ inch wide. The top groove 61 has a depth of 3/16 inch and a width of ¼ inch. A widening 62 of the groove is provided near the larger end of the body as a spherical surface merging with the groove floor. This element is mounted so that the larger end is above the smaller one, with the floor angle being 2 to 45 degrees from horizontal. The deposit material is fed to the widening 62 for melting; and the molten material then flows downward along the groove, with the stated taking-up of element substance to saturation, and then to the evaporating region 47 of increasing temperatures. The flow is regulated so that the film is from 0.020 to 0.125 inch deep upon arriving at the position shown generally by the line 63 and indicating the region at which erosion no longer occurs and major evaporation begins.

In the form of FIGS. 9–11, a second widening 64 can be provided between the widening 62 and the evaporation region 47, for receiving particles of the material employed for the vaporizing element, illustratively titanium boride, so that a large area is presented, by these detained particles, to the film of vaporizable material so that the saturation of the vaporizable material is at the expense of these particles rather than of the element body structure.

Figure 12:
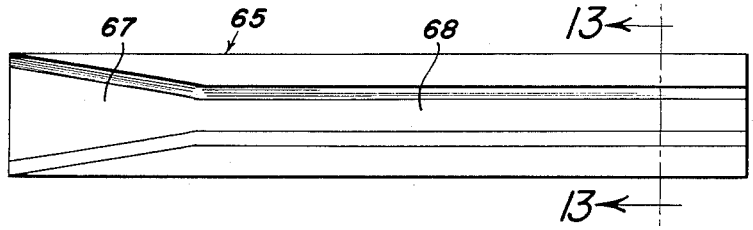
FIG. 12 is a top plan view of a fourth form of the element.
Figure 14:
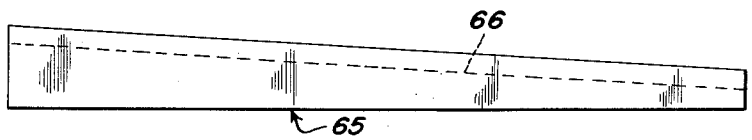
FIG. 14 is a side elevation of the element of FIG. 12.
Figure 13:
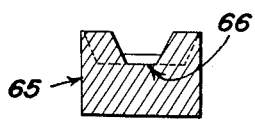
FIG. 13 is an end view of the element of FIG. 12.

The element 65 of FIGS. 12–14 resembles that of FIG. 6; but the floors 66 of the groove portions 67, 68 are in the same plane, as shown in FIG. 14, and the depth of the body tapers from a large end to a narrow end, wherewith the electrical conductivity and heating effect change as set out above. In service, the body is mounted with the groove floor at the deep section above the floor part at the thin end, with an angle as indicated above: and the deposit material is fed into the converging portion 67 of the groove.

Figure 15:
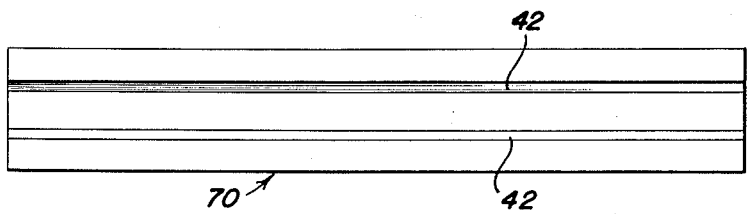
FIG. 15 is a top plan view of a fifth form of the element.

The groove of element 70, FIG. 15, is of uniform width, and can have a uniform depth, so that the element appears in side elevation as FIG. 14: the side walls 42 being shown bevelled.

Figure 16:
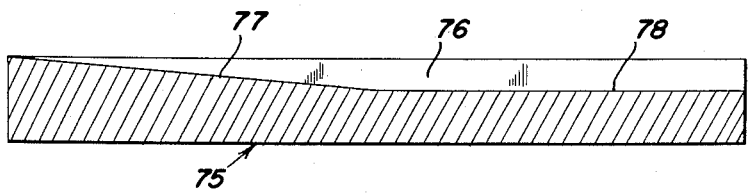
FIG. 16 is an upright longitudinal section of a sixth form of the element.

The element 75, FIG. 16, has a cross-section of uniform rectangular outline, with a groove 76 in its surface having a sloping floor 77 as in FIGS. 3 and 4 for a part of the distance from the left-hand end, i.e. the deeper sectioned end, of the element, and then a floor portion 78 parallel to its bottom and appearing in top plan as in FIG. 15.

Figure 17:
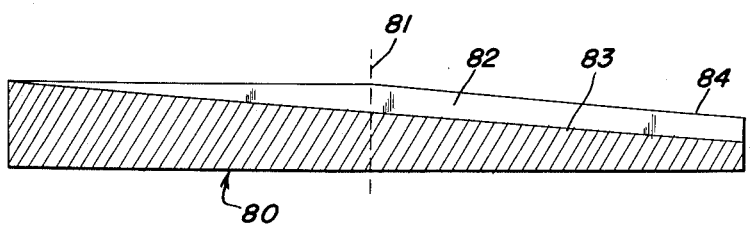
FIG. 17 is an upright longitudinal section of a seventh form of the element.

The element 80, FIG. 17, has a rectangular section at the left-hand end, this rectangular outline being continued along the length to the line 81 at which the dissolution of element substance substantially ceases. Beyond the line 81, the bottom and sides continue in their planes. The groove 82 can be of uniform width as in FIG. 15, with a sloping plane floor 83. The side wall thicknesses of the body are cut away on a slope 84, with further decrease of the body cross-section as the deeper groove end is approached.

The elements of FIGS. 15–17 are employed as before, noting that with each the body tapers from a thicker higher end toward a thinner lower end, so that the aforesaid differential heating effects are produced; and the groove floor in each case is preferably mounted at an angle as before.

Figure 19:
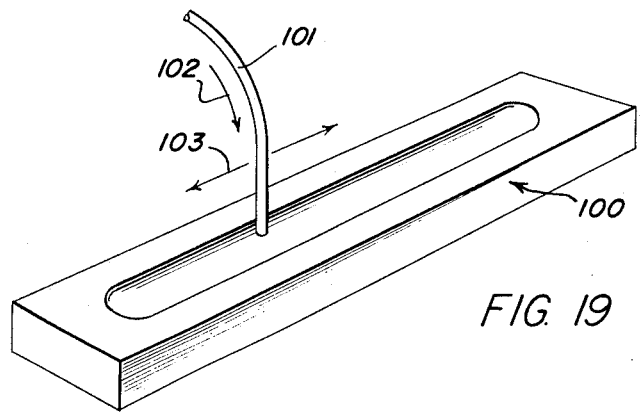
FIG. 19 is a perspective view of a prior practice of evaporating metal in vacuo from a resistively heated element.
Figure 20:
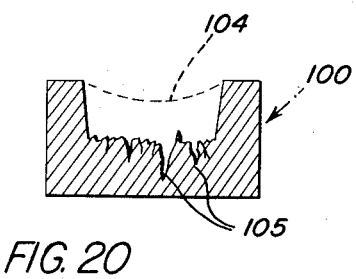
FIG. 20 is an upright transverse section of the element of FIG. 19, near the end of its service life.
Figure 21:
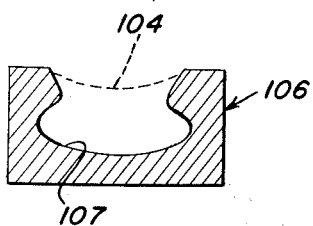
FIG. 21 is a similar upright section of an element according to the present invention, after a longer service period than the element of FIG. 20.

In FIG. 19, the resistively heated element 100 is supplied with aluminum from a wire 101 which is being fed at a regular rate in the direction of the arrow 102 while being moved back and forth along the length of the element in the directions of the double-headed arrow 103. The upper surface 104 of a new element 100 can be smooth, but the delivery of fresh metal, which is melted but not yet saturated with the element material, causes irregular etching of this surface to occur, so that for example after evaporation of 800 grams of aluminum, the element 100 may have a cross-section at some transverse plane along its length as shown by FIG. 20, from which it will be noted that one or more deep crevices 105 may be eroded more rapidly than the general depth reduction and thus determine the life of the element. By comparison, FIG. 21 shows the type of erosion occurring with the instant devices and method, using an element 106 of like weight and original depth and length but with provision for temperature increase from a melting zone to and through an evaporation zone. In FIG. 21, the erosion below the original top surface 104 proceeds regularly, as the molten film moves along, to give a smooth surface 107 after this element has evaporated 1800 grams.

The taper of the cross-section can be expressed as the ratio of the larger cross-sectional area A at the top of the material contacted region, to the smaller cross-sectional area $A_1$ at the bottom, noting that the electrical conduction should be as close to the terminal ends of the element as feasible; and in computing and making elements, the total length X can be employed. In general, the ratio of cross-sections, that is, $A/A_1$ should be above 1.2: ratios of 2.5 and over are permissible, when therewith the proportions of the element do not give a structure which is so short for its cross-sections that the heat evolved is not efficiently employed in melting and evaporating the deposit material. A ratio of 1.6 has been found very satisfactory.

If the angle of the taper be taken as $\alpha$ (alpha), desirable proportions for the heater having the bottom of the upright-sided groove at the taper angle relative to the bottom of the element (e.g. FIG. 3), are given by the formula:

(1) $$\frac{A}{A_1} = \frac{A}{A - X^2 \tan^2 \alpha}$$

noting that the cross-section can be regarded as an equilateral triangle as a first approximation.

When the sides are tapered, then a close approximation is:

(2) $$\frac{A}{A_1} = \frac{1 + 2x \tan \alpha}{A_1}$$

These equations apply as stated when the taper is continuous and uni-directional; and even when it is not substantially uniform nor extending over the whole length of the heater (note FIGS. 6 and 16).

The action of the elements and the deposit material therein is shown by the conventionalized FIG. 18 for the element of FIGS. 3–5, noting that a like action occurs for the other elements when likewise positioned with sloping floors. The supply of deposit material is by the illustrative filament or wire 23 of aluminum brought toward contact with the top of the element near the upper end of the groove floor 41, so that the material melts, wets the contacted walls and spreads therealong as a liquid layer 90 which has little or no evaporation from its upper surface, but whose lower surface is taking up small saturation quantities of the element substance: this layer may be 0.020 to 0.125 inch thick. Visually, the lower temperature due to lesser heating can be observed by the redder color of the incandescent mass. As this layer flows downward along the groove, it can take up small further amounts of the element substance in the region 45, noting that the temperature of the liquid metal is being constantly increased due to the increasing temperature at the successive cross-sections of the body. Evaporation of significant amount begins, and since the liquid metal is essentially saturated with element substance, no further erosion is present in the evaporation region 47. The evaporation rate in the region 47 is closely uniform per unit area, so that over this region a vapor is being evolved with the molecules moving at high speed away from the evaporation surface, as indicated by the arrows 91 and thus toward the juxtaposed substrate surfaces as in FIGS. 1 and 2, for forming a uniform deposit thereon. Therewith the thickness of the film of vaporizable material, present as a saturated solution, decreases in proportion to its evaporation, as indicated by the decreasing thickness of the portion 92 of this film, along the region 47.

The position of the lower end of the region 47 can be observed visually, as the "dry" region of the element below it appears of a brighter color, indicating the greater temperature. The illustrative aluminum, as a vaporizable material, has relatively low specific heat and heat of fusion so that there is relatively low heat demand, in calories or B.t.u., at the melting region: but the latent heat of vaporization is significant, and this energy is supplied by the described practice of having a reduced body section. In practice, a maintained temperature differential of 50 to 70 degrees C., has been found effective to have the melting region at a temperature for melting but not significantly evaporating the aluminum, and the vaporization region competent to give a high vapor tension and high evaporating rate to the aluminum. Therewith, for the specific illustrative element of titanium boride, a potential change of 0.1 volt permits effective control. At optimum operating condition, for minimum corrosion of the element, the rate of feed of vaporizable material can be varied inversely to the voltage change, and a regular vaporization maintained. Likewise, when the "dry" area appears to creep upward at the bottom of the groove, normally the compensation can be by increasing the feed rate or reducing the voltage: noting the limitation that the reduction of voltage must not reduce the upper end below the temperature of easy melting and flow, nor the increase of voltage cause excessive evaporation in the melting and saturation regions.

In practice, elements have been operated for 15 hours, compared to the few hours with elements of like dimensions and having uniform temperatures along their length and feeding for such lengths. The corrosion pattern is smooth, and evaporations of 125 grams per $cm.^2$ have been attained.

Other vaporizable materials can be utilized. The metals copper, gold, iron, nickel and cobalt can be vaporized regularly.

The illustrative titanium diboride elements were prepared by pressing the powder in stainless steel die blocks at 2000 pounds per square inch: then heating in vacuum for sintering at around 1100 degrees C.: and finally heating in hydrogen at 2100–2200 degrees C. to complete the formation of the coherent mass. The grooves and surfaces can be dressed by grinding, preferably before the final heating.

Materials can be employed for the vaporizer elements, such as the borides, nitrides, silicides and carbides of the hard metals. Mixtures of the borides and carbides can be employed. The nitrides of boron and silicon can be used. Boron nitride is very insoluble at operating conditions, but its electrical conductivity should be increased by employment in mixture with a more conductive material: thus mixtures of boron nitride with silicon nitride or titanium boride have preferred electrical conductivity.

The illustrative practices are not restrictive: and the invention can be employed in many ways within the scope of the appended claims.

What is claimed is:

1. The method of producing vapors for vacuum deposition of a meltable and vaporizable material, which comprises providing a heater body having a greater effective cross-section at one end than at the other end and an upper surface for supporting the molten metal, mounting the body in a vacuum chamber with said upper surface of the body inclined downwardly from the said one end thereof at an angle of 2 to 45 degrees, applying an electrical potential difference from one end of the body to the other whereby the body is resistively heated with a first region at said one end of said surface above the melting point of the vaporizable material and below the temperature of significant evaporation thereof and other and lower parts of said surface at temperatures above that for the evaporation of the material, and supplying the vaporizable material to said surface near the upper end thereof whereby the melted material will flow downward on said surface from said first region onto said other parts of said surface and therewith attain higher temperatures and be vaporized at said other parts.

2. The method of producing vapors for vacuum deposition of a meltable and vaporizable material, which comprises an electrically resistive heater body having an upper surface for supporting the material, the resistivity of one end portion being greater than that of the other end portion, mounting the body in a vacuum chamber with the said upper surface inclined downwardly toward the end of greater resistivity, applying an electrical potential difference between the ends of the body and thereby heating the body with the higher end of said surface at a temperature above the melting point of the vaporizable material and below that of significant evaporation of said material and with the lower portion of said surface at a temperature for evaporation of said material, and supplying the vaporizable material onto said surface adjacent the upper end thereof whereby the material is melted and flows downward over the surface through regions of successively higher temperature and evaporates therefrom.

3. A vaporizing heater for vacuum deposition comprising a body having ends for its connection in an electrical circuit, said body being of resistant material for heating by current flow therealong, the body having a groove in its upper surface inclined downwardly from one end toward the other, the cross-section of the body at portions thereof including said groove being greater at the upper end of the groove than at the lower end thereof, with the cross-sections of the body decreasing from that of the said upper end of the groove to that at the lower.

4. A vaporizing heater for vacuum deposition, comprising a body of resistant material for heating by current flow therealong, said body having a groove in its top surface, the groove having side walls extending with a convergent taper from one end of the body, said tapered walls joining parallel walls extending toward the other end of the body.

5. A vaporizing heater for vacuum deposition, comprising a body of resistant material for heating by current flow therealong, said body having a longitudinal groove in its top surface, the groove having a plane floor and being deeper at one end of the body than at the other and the body cross-section at the shallow end of the groove being of greater area than that at the deeper end thereof, the body cross-section decreasing from the shallow end of the groove toward the other end so that a substantially regular change of effective electrical resistance and thereby increase of heating effect is provided from said shallow end toward said deeper end.

6. A vaporizing heater for vacuum deposition, comprising a body of resistant material for heating by current flow therealong, a first region for the melting of the vaporizable material to be deposited and a second region for the evaporation of such material, said body having a groove of substantially uniform cross-section extending along its top surface, the body having a substantially uniform depth and having at least parts of its side walls convergently tapered from one end thereof, with the wider end adjacent the said first region whereby the heating effect of the current flow along the body is greater at the second region than at the first region.

7. A heater as in claim 6, at which the top of the body, at the wider end thereof has a depression forming a widening of the groove.

8. A vaporizing heater for vacuum deposition, comprising a body of resistant material for heating by current flow therealong, said body having a plane bottom and a longitudinal groove in its top surface, the body having substantially parallel sides and being deeper from the bottom of the groove to the bottom of the body at one end of the groove than at the other, the bottom of the groove being substantially straight and converging toward the bottom of the body.

9. A vaporizing heater for vacuum deposition, comprising a body of resistant material for heating by current flow therealong, said body having a plane bottom and having a longitudinal groove in its top surface, the groove having a floor of substantially uniform width, the side surfaces of the groove being inclined convergently downward.

10. A vaporizing heater for vacuum deposition comprising a body having ends for its connection in an electric circuit, said body being of resistant material for heating by current flow therealong, the body having a groove in its upper surface, the cross-sections of the body at portions thereof including said groove being greater adjacent one end than adjacent the other end whereby said one end is more highly heated by the current, and with a regular decrease of cross-section therebetween.

11. A vaporizing heater for vacuum deposition comprising a body having ends for its connection in an electric circuit, said body being of resistant material for heating by current flow therealong, the body having a first region for the melting of the vaporizable material to be deposited, and a second region for the evaporation of such material, said body having a groove in its top surface extending through said regions, a first cross-section of the body at the part of the groove where the molten material passes from the first into the second region being smaller than a second cross-section at a part of the groove at said first region whereby the body is more highly heated as it passes to the second region than it is heated in said first region, said body having cross-sections at other parts of the second region which are not larger than said first cross-section.

12. A heater as in claim 11, in which the cross-sections of the body regularly decrease from said first cross-section to the other end of said second region.

References Cited in the file of this patent

UNITED STATES PATENTS

| | | |
|---|---|---|
| 2,665,226 | Godley et al. | Jan. 5, 1954 |
| 2,693,521 | Alexander | Nov. 2, 1954 |

FOREIGN PATENTS

| | | |
|---|---|---|
| 953,677 | Germany | Dec. 6, 1956 |